United States Patent [19]

Garner

[11] Patent Number: 4,834,504

[45] Date of Patent: May 30, 1989

[54] LCD COMPENSATION FOR NON-OPTIMUM VOLTAGE CONDITIONS

[75] Inventor: Grant K. Garner, Corvallis, Oreg.

[73] Assignee: Hewlett-Packard Company, Palo Alto, Calif.

[21] Appl. No.: 107,061

[22] Filed: Oct. 9, 1987

[51] Int. Cl.[4] .......................... G02F 1/13; G09G 3/36

[52] U.S. Cl. ................................ 350/332; 350/331 R; 350/331 T; 307/359; 307/529

[58] Field of Search .................. 350/331 T, 332, 333, 350/331 R; 307/227, 529, 264, 268, 260, 359; 340/784, 805, 812, 813, 767, 811, 765

[56] References Cited

U.S. PATENT DOCUMENTS

| | | | |
|---|---|---|---|
| 3,973,252 | 8/1976 | Mitomo et al. | 340/805 |
| 4,342,906 | 8/1982 | Hyatt | 250/205 |
| 4,626,841 | 12/1986 | Togashi | 340/805 |
| 4,669,825 | 6/1987 | Itoh et al. | 350/332 |
| 4,726,658 | 2/1988 | Nishimura et al. | 350/332 |
| 4,769,639 | 9/1988 | Kawamura et al. | 340/811 |
| 4,781,437 | 11/1988 | Shields et al. | 350/333 |

FOREIGN PATENT DOCUMENTS

| | | | |
|---|---|---|---|
| 0224869 | 6/1987 | European Pat. Off. | 350/332 |
| 0200229 | 10/1985 | Japan | 350/332 |

OTHER PUBLICATIONS

Horowitz et al., "The Art of Electronics"-Cambridge University Press, 1980-pp. 17 and 39.

*Primary Examiner*—Stanley D. Miller
*Assistant Examiner*—Tai V. Duong

[57] ABSTRACT

A liquid crystal display (LCD) compensation circuit, operating within a peak voltage limitation, serves to maximize the on/off voltage ratio applied to the LCD while at the same time meeting the LCD threshold voltage specification to thereby optimize the appearance of the liquid crystal display at all times.

8 Claims, 3 Drawing Sheets

LCD COMPENSATION FOR NON-OPTIMUM VOLTAGE CONDITIONS

BACKGROUND AND SUMMARY OF THE INVENTION

This invention relates generally to liquid crystal (LCD) displays of the type commonly used in calculators and computers and, more particularly, to multiplexed liquid crystal displays in which many display elements or pixels are driven by each row and column signal line. The intersection of each type of signal line generates one display element or pixel which can be controlled independently of the other display elements that comprise a matrix of such display elements. Each pixel responds to the RMS voltage difference between the row and column signals to that pixel. A higher RMS voltage difference applied to a pixel results in turning that pixel on harder, thereby making it appear darker to the user.

Typically, six different voltages are used to drive a 32-way or higher multiplexed liquid crystal display. Therefore, each pixel has some RMS voltage across it at all times. Two important parameters affect the appearance to the user of the display. First, the absolute value of the RMS voltage applied to an on pixel or to an off pixel basically determines the lightness or darkness of the display. In addition, an on/off ratio or bias level is defined as the ratio of the on and off waveform voltages applied to each pixel. It is desirable to maximize the on/off ratio in order to make an off pixel appear as much different as possible from an on pixel to the user. At the same time, it is important to guarantee that an off pixel does not appear dark or on to the user, but that an on pixel does appear dark to the user. The voltages required to obtain this condition are set by the manufacturer of the liquid crystal display. The state of the art in LCD manufacturing is such that in order to meet the LCD threshold voltage specification under ideal bias conditions (maximum on/off ratio) requires a high peak voltage across the pixel. The maximum peak voltage that can be safely applied to an LCD driver chip without destroying it is specified by the chip manufacturer. In many liquid crystal display systems, the peak voltage that may be permitted is limited such that the LCD threshold voltage specification and ideal bias level cannot both be maintained. This limitation on peak voltage can be one imposed by the chip manufacturer or by the user's LCD driver circuitry. It is therefore the principal object of the present invention to provide LCD compensation, operating within a peak voltage limitation, that maximizes the bias level while at the same time meeting the LCD threshold voltage specification.

One type of prior art LCD compensation technique maintains the ideal bias level (maximum on/off ratio) without controlling the threshold voltage level. In this case, the display becomes dim as peak voltage limitations are imposed. Another type of prior art LCD compensation technique maintains the threshold voltage specification for the LCD without controlling the on/off ratio. In this second case, the display contrast suffers at all times, thus making making it difficult for the user to distinguish between pixels that are off and those that are on.

The LCD compensation technique of the present invention dynamically chooses between the options of threshold voltage level and bias level in order to optimize the appearance of the display at all times. It is intended to maintain the off voltage constant even when peak voltage must be reduced below its optimum level. This is because a plot of on reflectance versus RMS voltage shows flat reflectance at each voltage extreme but rapidly changing reflectance over small central RMS voltage changes. In accordance with the illustrated embodiment of the present invention some function of the peak voltage is fed into generation of the other voltage levels employed in the waveforms applied to the LCD row and column signal lines. A peak voltage $V_H$ and a step voltage $V_B$ are the starting points for derivation of all other waveform voltage levels. A reference voltage $V_A$ is the desired voltage to be applied to the LCD based upon temperature and user's contrast setting.

DESCRIPTION OF THE DRAWINGS

FIG. 1 is a block diagram of an LCD compensation circuit in accordance with the present invention.

DESCRIPTION OF THE PREFERRED EMBODIMENT

Figure 1A:
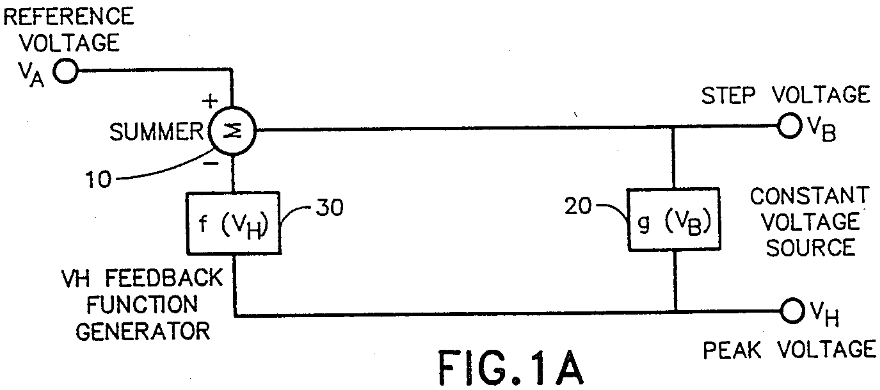
FIG. 1A is a block diagram of the LCD compensation circuit of FIG. 1 in which the peak voltage function generator comprises a constant voltage source.
Figure 1B:
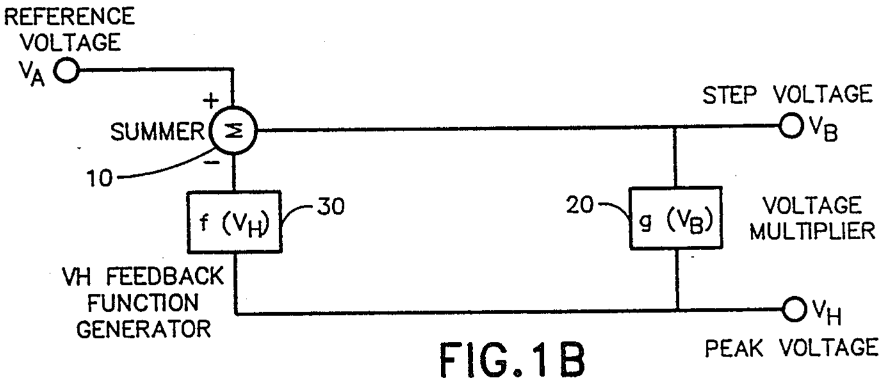
FIG. 1B is a block diagram of the LCD compensation circuit of FIG. 1 in which the peak voltage function generator comprises a voltage multiplier.
Figure 1C:
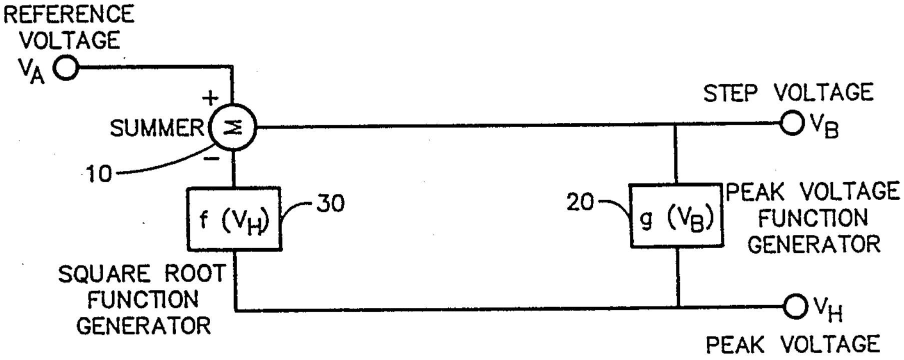
FIG. 1C is a block diagram of the LCD compensation circuit of FIG. 1 in which the feedback function generator comprises a square root function generator.

Referring now to the block diagram of FIG. 1, a reference voltage $V_A$ that represents a desired voltage to be applied to an LCD, taking into account the temperature coefficient of the LCD and the user's contrast setting, and that may be derived externally from a summation of diode voltages, is applied to a conventional summer 10. The output of summer 10 represents a step voltage $V_B$. The output of summer 10 is also applied to a peak voltage function generator 20. Peak voltage function generator 20 may comprise, for example, a constant voltage source or a voltage multiplier whose output is simply a multiple of the applied input voltage. The output of peak voltage function generator 20 is defined as the peak voltage $V_H$. Other functions for peak voltage function generator 20 could be chosen depending on desired characteristics of the relationship between the step voltage $V_B$ and the peak voltage $V_H$ and may include any constraints or limits that it is desired to impose on the peak voltage $V_H$. As stated above, $V_H$ represents the peak voltage applied to the LCD, based on limitations imposed by the LCD driver chip itself or the LCD display system as a whole. The safety of the LCD driver chip could be in jeopardy if an excessive peak voltage is applied or the display system as a whole may simply not be capable of supplying a peak voltage higher than a certain level.

The output of peak voltage function generator 20 is applied to a $V_H$ feedback function generator 30, whose output may be a predefined function, such as a fractional or square root function, for example, of its input. It has been found that the fractional function 0.28 for peak voltage function generator 20 maintains the LCD off voltage relatively constant over an expected range of limitation on peak voltage $V_H$. Other functions may be implemented by the feedback function generator 30 based upon design parameters such as the LCD multiplexing level, the function implemented by peak voltage function generator 20, and the expected limitations on peak voltage $V_H$. The output of $V_H$ feedback function generator 30 is subtracted from the reference voltage $V_A$ in summer 10 to produce a continuously updated value of step voltage $V_B$.

Figure 2:
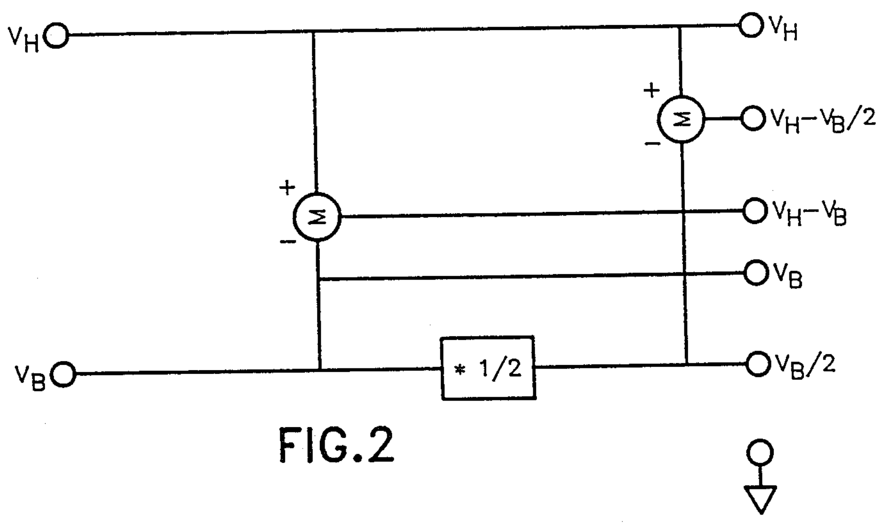
FIG. 2 is a block diagram of circuitry employed to derive all waveform voltages necessary for driving an LCD display from the peak voltage and the step voltage produced by the circuit of FIG. 1.

Referring now to FIG. 2, there are shown conventional summer and multiplier circuit blocks employed to combine the peak voltage $V_B$ and the step voltage $V_H$ supplied by the circuitry of FIG. 1 to provide a number of different voltages to be switched onto the LCD row and column signal lines.

Figure 3:
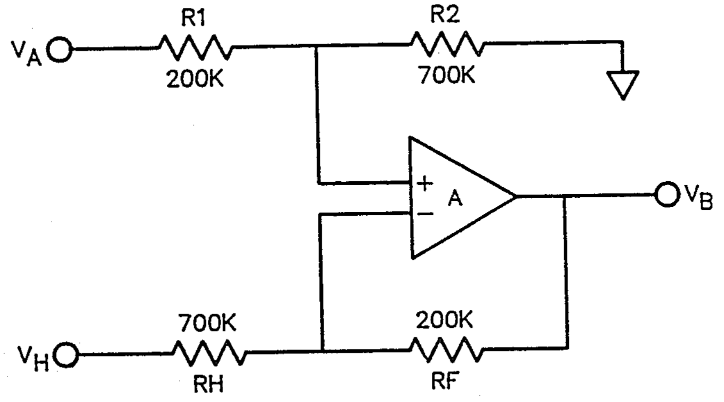
FIG. 3 is a shematic diagram of a resistor summing amplifier that implements a portion of the LCD compensation circuit of FIG. 1.

Referring now to FIG. 3, there is shown a schematic diagram of a resistor summing amplifier circuit that implements the preferred functions of summer 10 and $V_H$ feedback function generator 30 of FIG. 1. In this resistor summing amplifier circuit, the step voltage $V_B = V_A(1+RF/RH)(R2/(R1+R2)) - V_H(RF/RH) = V_A - 0.28\ V_H$.

Figure 4:
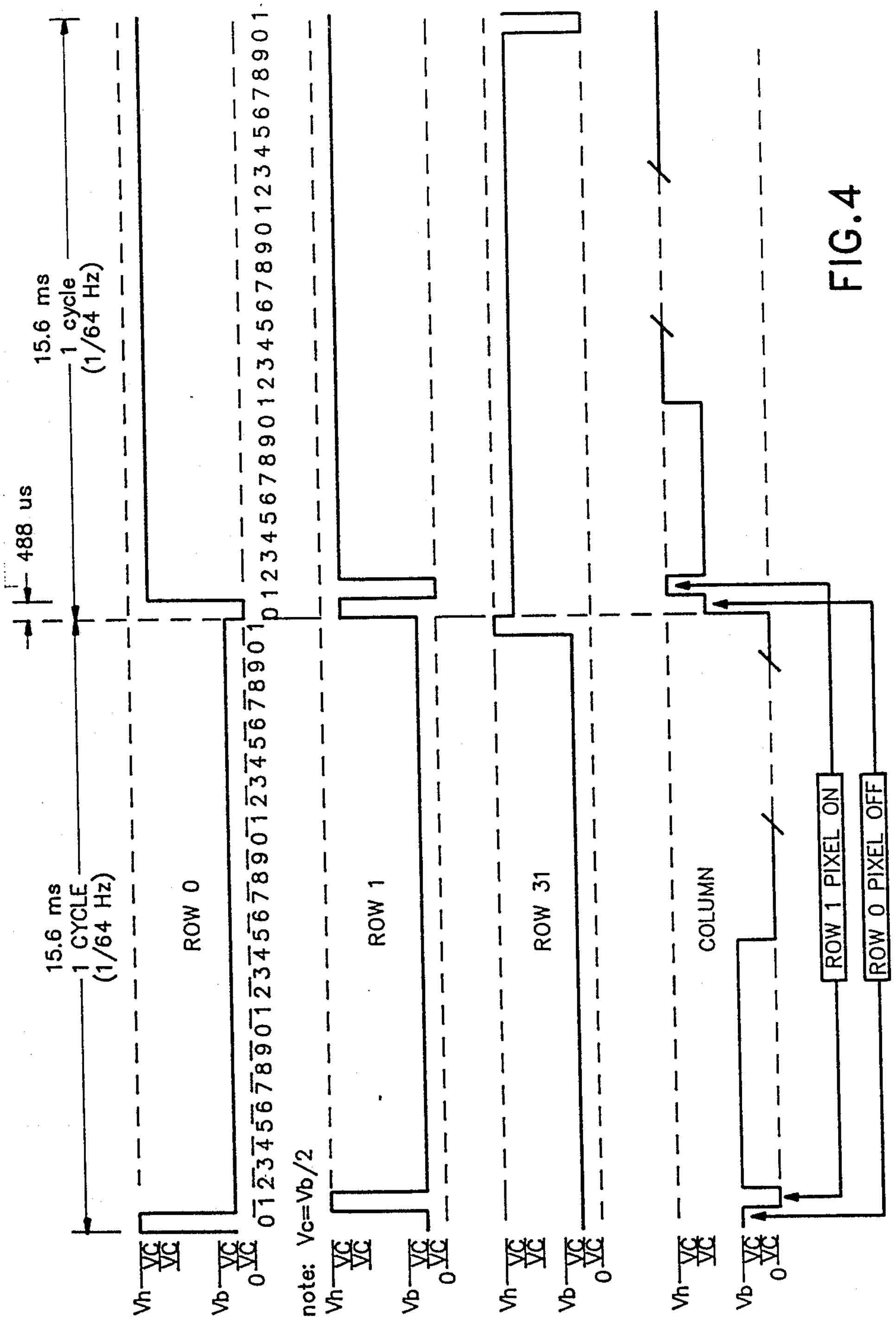
FIG. 4 is a waveform diagram illustrating the various signals provided by the circuits of FIGS. 1 and 2 as they are applied to a typical 32-way multiplexed display.

Referring now to FIG. 4, there are illustrated the various waveforms derived from the voltages supplied by the circuits of FIGS. 1 and 2 as they are applied to a typical 32-way multiplexed LCD display. At any point in time four voltages are employed to drive the LCD display. All rows except the selected row are driven with the row non-select voltage, while the selected row is driven by the row select voltage. Any column which has an on pixel in the current row is driven to the column select voltage level, while off columns in the current row are driven to the column non-select voltage. The voltage seen by each pixel is the difference of its column and row voltages. As stated above, pixels respond to the RMS voltage across them. By setting the row non-select voltage, $V_c$, halfway between the column select voltage level and the column non-select voltage level, each pixel can only see a change in its RMS voltage when its row is selected. Since pixels are turned on by higher RMS voltage, the row select and column select voltages are set at the opposite extremes of the available voltage. The voltage difference between the column select and column non-select voltage levels is what has been referred to in the description above as the step voltage $V_B$. One-half the ratio of the step voltage $V_B$ to the peak voltage $V_H$ is referred to as the LCD bias. Thus, bias $= V_B/(2^*V_H)$. For maximum on to off voltage ratio, the ideal bias for 32 rows is about 1/6.66. In effect, step voltage $V_B$ is approximately equal to 0.3 times the peak voltage $V_H$.

I claim:

1. A passive matrix liquid crystal display compensation circuit, the circuit comprising:

reference voltage source means for supplying a desired reference voltage to be applied to the passive matrix liquid crystal display;

summer means having a first summing input for receiving the reference voltage, having a second summing input, and having an output providing a step voltage;

peak voltage function generator means having an input for receiving the step voltage and having an output that provides a source of peak voltage; and feedback function generator means having an input for receiving the peak voltage and having an output connected to the second summing input of the summer means, the summer means being thereby operative for subtracting the output of the feedback function generator means from the reference voltage to produce a continuously updated value of step voltage.

2. A liquid crystal display compensation circuit as in claim 1 wherein the peak voltage function generator means comprises a constant voltage source.

3. A liquid crystal display compensation circuit as in claim 1 wherein the peak voltage function generator means comprises a voltage multiplier.

4. A liquid crystal display compensation circuit as in claim 1 wherein the output of the feedback function generator means is a defined fractional function of its input.

5. A liquid crystal display compensation circuit as in claim 4 wherein the defined fractional function is equal to 0.28.

6. A liquid crystal display compensation circuit as in claim 1 wherein the output of the feedback function generator means is a defined square root function of its input.

7. A liquid crystal display compensation circuit as in claim 1 wherein the output of the feedback function generator means is related to its input by a multiple of 0.28.

8. A liquid crystal display compensation circuit as in claim 1 wherein the summer means and the feedback function generator means comprise a resistor summing amplifier.

* * * * *